(12) United States Patent
Park et al.

(10) Patent No.: US 9,173,215 B2
(45) Date of Patent: *Oct. 27, 2015

(54) TRANSMISSION AND RECEPTION OF CONTROL INFORMATION

(71) Applicant: KT CORPORATION, Gyeonggi-do (KR)

(72) Inventors: Kyu Jin Park, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 139 days.

This patent is subject to a terminal disclaimer.

(21) Appl. No.: 14/023,754

(22) Filed: Sep. 11, 2013

(65) Prior Publication Data

US 2014/0078983 A1    Mar. 20, 2014

(30) Foreign Application Priority Data

Sep. 14, 2012  (KR) ........................ 10-2012-0102452
Oct. 8, 2012   (KR) ........................ 10-2012-0111501
Dec. 12, 2012  (KR) ........................ 10-2012-0144531

(51) Int. Cl.
  *H04W 72/04*   (2009.01)
  *H04L 5/00*    (2006.01)

(52) U.S. Cl.
  CPC ........... *H04W 72/042* (2013.01); *H04L 5/0053* (2013.01); *H04L 5/0035* (2013.01); *H04L 5/0048* (2013.01)

(58) Field of Classification Search
  None
  See application file for complete search history.

(56) References Cited

U.S. PATENT DOCUMENTS

2011/0312363 A1* 12/2011 Kolding et al. ............... 455/513
2012/0002740 A1*  1/2012 Han et al. ..................... 375/260
2012/0220327 A1*  8/2012 Lee et al. ...................... 455/509
2014/0078987 A1*  3/2014 Park et al. ..................... 370/329

OTHER PUBLICATIONS

Panasonic, "RE mapping for ePDCCH", R1-123287, 3GPP TSG RAN WG1 Meeting #70, Qingdao, China, Aug. 13-17, 2012, pp. 1-8.
Renesas Mobile Europe Ltd., "Remaining details on ePDCCH antenna port association", R1-123587, 3GPP TSG RAN WG1 Meeting #70, Qingdao, China, Aug. 13-17, 2012, pp. 1-6.
Fujitsu, "Definition of eREG and eCCE", R1-122068, 3GPP TSG RAN WG1 Meeting #69, Prague, Czech Republic, May 21-25, 2012, pp. 1-4.
Interdigital Communications, LLC., "On ePDCCH Multiplexing", R1-121319, 3GPP TSG RAN WG1 Meeting #68bis, Jeju, Korea, Mar. 26-30, 2012, pp. 1-5.
Mediatek Inc., "Necessity of Multiplexing of Localized and Distributed ePDCCH Parts in the Same PRBs", R1-122168, 3GPP TSG RAN WG1 #69, Prague, Czech Republic, May 21-25, 2012, pp. 1-3.

(Continued)

*Primary Examiner* — Min Jung
(74) *Attorney, Agent, or Firm* — IP Legal Services, LLC

(57) ABSTRACT

The disclosure is related to transmitting control information in a transmission/reception point and to receiving the control information in user equipment. Particularly, the present disclosure relates to transmitting the control information for user equipment which receives downlink control information through a downlink control channel newly defined in a data region. Furthermore, the present disclosure relates to performing a resource mapping for enhanced control channel elements (ECCEs) of an enhanced physical downlink control channel (EPDCCH).

20 Claims, 7 Drawing Sheets

(56) References Cited

OTHER PUBLICATIONS

Korean Intellectual Property Office, International Search Report for International Application No. PCT/KR2013/008191, Dec. 23, 2013.
Korean Intellectual Property Office, Written Opinion of the International Searching Authority for International Application No. PCT/KR2013/008191, Dec. 23, 2013.

NEC Group, "ePDCCH search space design", R1-123253, 3GPP TSG RAN WG1 Meeting #70, Qingdao, China, Aug. 13-17, 2012, pp. 1-6.
Korean Intellectual Property Office, International Search Report for International Application No. PCT/KR2013/008329, Dec. 27, 2013.
Korean Intellectual Property Office, Written Opinion of the International Searching Authority for International Application No. PCT/KR2013/008329, Dec. 27, 2013.

* cited by examiner

TRANSMISSION AND RECEPTION OF CONTROL INFORMATION

CROSS REFERENCE TO PRIOR APPLICATIONS

The present application claims priority under 35 U.S.C. §119 to Korean Patent Application No. 10-2012-0102452 (filed on Sep. 14, 2012), Korean Patent Application No. 10-2012-0111501 (filed on Oct. 8, 2012), and Korean Patent Application No. 10-2012-0144531 (filed on Dec. 12, 2012), which are hereby incorporated by reference in their entirety.

BACKGROUND

The present disclosure relates to transmitting control information in a transmission/reception point and to receiving the control information in user equipment. Particularly, the present disclosure relates to a method and an apparatus (e.g., a transmission/reception point) for transmitting control information for user equipment which receives downlink control information through a downlink control channel newly adopted (or defined) in a data region. Furthermore, the present disclosure relates to a method and an apparatus (e.g., user equipment) for receiving the control information.

A wireless communication system has been designed to transmit a mass amount of data to many subscribers. However, increasing the capacity of the wireless communication system is difficult due to the limited resources of a control region. For overcoming such limitation, using a downlink control channel in a data region might be required to transmit downlink control information.

Meanwhile, typical control channel elements (CCEs) are associated with assignment of a downlink control channel in a control region. Lately, enhanced control channel elements (ECCEs) are newly defined for assigning the downlink control channel in a data region. Accordingly, developing a resource assignment scheme associated with the newly-defined ECCEs might be required.

SUMMARY

The present embodiment is to provide an enhanced control channel element ECCE/enhanced resource element group (EREG) mapping method for a downlink control channel transmission in a data region. Furthermore, the present embodiment is to provide a method and an apparatus for performing ECCE indexing in a localized 'enhanced physical downlink control channel' (EPDCCH) set.

In accordance with at least one embodiment, a method may be provided for transmitting control information to user equipment through a data region of a physical resource-block (PRB) pair in a subframe, in a transmission/reception point. The method may include forming enhanced control channel elements (ECCEs), wherein (i) resource elements (REs) in the PRB pair may be indexed by repetitively using 16 numbers according to a frequency-first scheme, (ii) resource elements (REs) having an identical index may be included in an identical enhanced resource-element group (EREG), and (iii) each of the ECCEs may include EREGs corresponding to EREG indices having an identical remainder when the EREG indices are divided by N, where the N is one of 4 and 2; and transmitting the control information to the user equipment through at least one of the ECCEs.

In accordance with another embodiment, a method may be provided for receiving control information from a transmission/reception point through a data region of a physical resource-block (PRB) pair in a subframe, in user equipment. The method may include receiving a wireless signal through at least one enhanced control channel element (ECCE), wherein (i) resource elements (REs) in the PRB pair may be indexed by repetitively using 16 numbers according to a frequency-first scheme, (ii) resource elements (REs) having an identical index may be included in an identical enhanced resource-element group (EREG), and (iii) each of ECCEs may include EREGs corresponding to EREG indices having an identical remainder when the EREG indices are divided by N, where the N is one of 4 and 2; and obtaining the control information from the received wireless signal.

In accordance with still another embodiment, a transmission/reception point may be provided for transmitting control information to user equipment through a data region of a physical resource-block (PRB) pair in a subframe. The transmission/reception point may include a control processor and a transmitter. The control processor may be configured to form enhanced control channel elements (ECCEs). Herein, (i) resource elements (REs) in the PRB pair may be indexed by repetitively using 16 numbers according to a frequency-first scheme, (ii) resource elements (REs) having an identical index may be included in an identical enhanced resource-element group (EREG), and (iii) each of the ECCEs may include EREGs corresponding to EREG indices having an identical remainder when the EREG indices are divided by N, where the N is one of 4 and 2. The transmitter may be configured to transmit the control information to the user equipment through at least one of the ECCEs.

In accordance with still another embodiment, user equipment may be provided for receiving control information from a transmission/reception point through a data region of a physical resource-block (PRB) pair in a subframe. The user equipment may include a receiver and a control processor. The receiver may be configured to receive a wireless signal through at least one enhanced control channel element (ECCE). Herein, (i) resource elements (REs) in the PRB pair may be indexed by repetitively using 16 numbers according to a frequency-first scheme, (ii) resource elements (REs) having an identical index may be included in an identical enhanced resource-element group (EREG), and (iii) each of ECCEs may include EREGs corresponding to EREG indices having an identical remainder when the EREG indices are divided by N, where the N is one of 4 and 2. The control processor may be configured to obtain the control information from the received wireless signal.

DETAILED DESCRIPTION OF EMBODIMENTS

Figure 1:
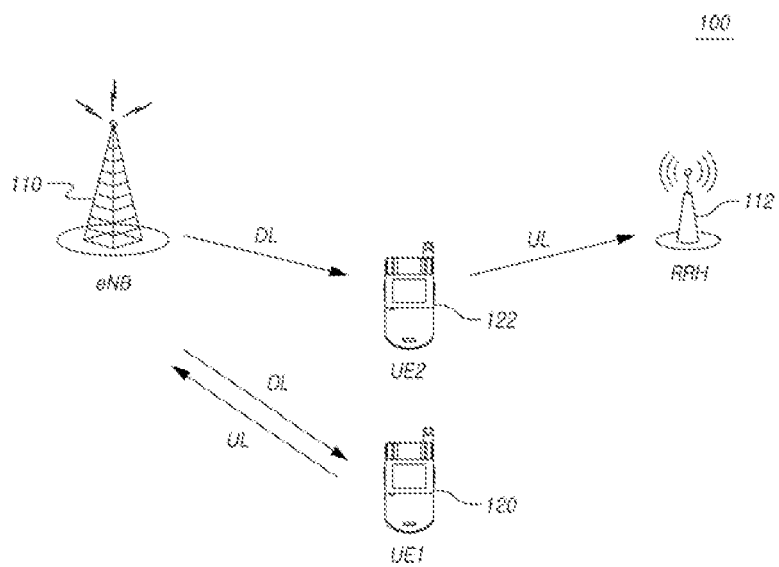
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of transmission/reception point (e.g., eNB) 110 and transmission/reception point (e.g., RRH) 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power, or a low transmission power within a macrocell region. The transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

eNB (e.g., 110) may perform a downlink transmission to user equipment (e.g., 120 and/or 122). eNB (e.g., 110) may transmit PDSCH corresponding to a primary physical channel, for unicast transmission. Furthermore, eNB (e.g., 110) may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

In a wireless communication, one radio frame may consist of 10 subframes, and one subframe may consist of two slots. The radio frame may have a length of 10 ms, and the subframe may have a length of 1.0 ms. Typically, a basic unit of a data transmission may be a subframe, and a downlink or uplink scheduling may be performed in a unit of subframes. In the case of a normal cyclic prefix (CP), one slot may include 7 OFDM symbols in the time domain. In the case of an extended cyclic prefix (CP), one slot may include 6 OFDM symbols in the time domain.

For example, the frequency domain in a wireless communication may be formed in a unit of subcarriers having an interval of 15 kHz.

In a downlink, time-frequency resources may be determined in a unit of resource blocks (RBs). A resource block (RB) may consist of one slot in the time axis and 180 kHz (12 subcarriers) in the frequency axis. Resource elements consisting of 'one subcarrier (corresponding to 2 slots) in the time axis' and '12 subcarriers in the frequency axis' may be referred to as 'a resource-block pair (RBP).' A total number of resource blocks may differ according to a system bandwidth.

A resource element (RE) may consist of one OFDM symbol in the time axis and one subcarrier in the frequency axis. One resource-block pair (RBP) may include '14×12 resource elements' (in the case of a normal CP) or '12×12 resource elements' (in the case of an extended CP).

Figure 2:
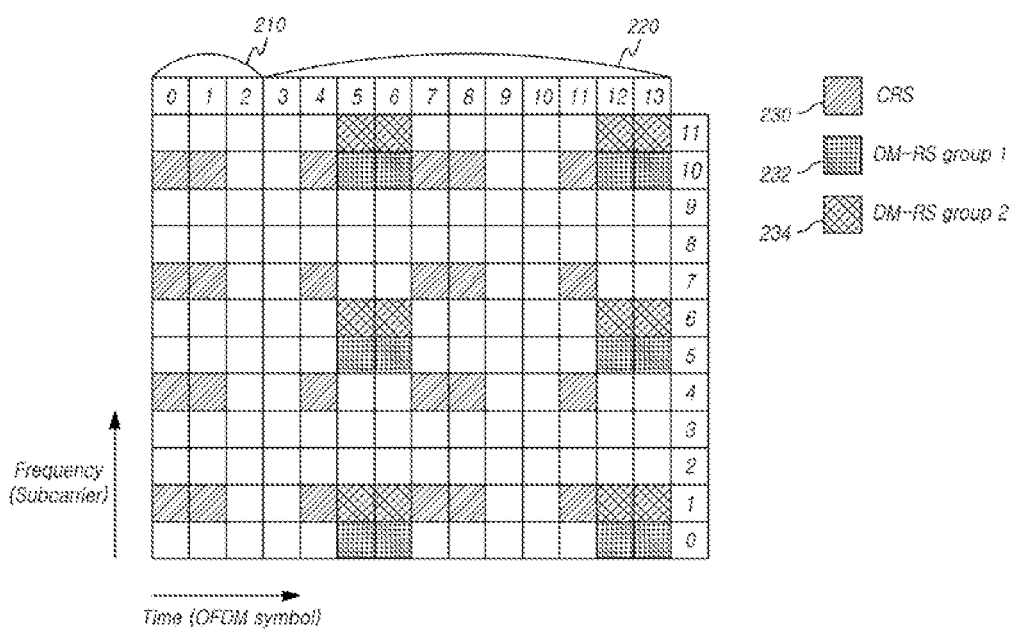
FIG. 2 illustrates one resource-block pair in the case of a normal cyclic prefix (normal CP), as an example of a structure of downlink resources in a long term evolution (LTE) or LTE-Advanced (LTE-A) system.

FIG. 2 illustrates one resource-block pair (RBP) in the case of a normal cyclic prefix (normal CP), as an example of a structure of downlink resources in a long term evolution (LTE) or LTE-Advanced (LTE-A) system.

Referring to FIG. 2, in the case of a normal cyclic prefix (CP), one resource-block pair (RBP) may consist of 14 OFDM symbols (l=0, 1, . . . , 13) and 12 subcarriers (k=0, . . . , 11). In an embodiment shown in FIG. 2, one resource-block pair (RBP) may include 14 OFDM symbols. Among the 14 OFDM symbols, preceding three OFDM symbols (l=0~2) may correspond to control region 210 assigned for control channels such as a physical control format indicator channel (PCFICH), a physical hybrid ARQ indicator channel (PHICH), a physical downlink control channel (PDCCH), and so forth. The remaining OFDM symbols (l=3~13) may correspond to data region 220 assigned for data channels such as a physical downlink shared channel (PDSCH). Although three OFDM symbols are allocated for control region 210 in FIG. 2, one to four OFDM symbols may be allocated for control region 210, according to embodiments. Information on the size of control region 210 may be transferred through the PCFICH. Herein, the size information may be set as the number of OFDM symbols.

PDCCH may be transmitted through an entire system bandwidth, PDSCH may be transmitted based on resource blocks. User equipment may identify a corresponding PDCCH (i.e., a PDCCH assigned to the user equipment), and enter a micro sleep mode when there is no data (i.e., data for the user equipment) in the corresponding PDCCH. Accordingly, it may be possible to reduce a power consumption of the user equipment in data region 220.

Referring to FIG. 2, reference signals may be mapped to specific resource elements of a downlink. That is, a common reference signal (or cell-specific reference signal, hereinafter referred to as "CRS") 230, demodulation reference signals (DM-RS) (or UE-specific reference signals) 232 and 234, a channel-state information reference signal (CSI-RS), and so forth may be transmitted through a downlink. In FIG. 2, only CRS 230 and DM-RS 232 and 234 have been illustrated for convenience of description.

CRS 230 in control region 210 may be used to perform a channel estimation for decoding of PDCCH. CRS 230 in data region 220 may be used for downlink channel measurement. Channel estimation for data decoding of data region 220 may be performed using DM-RSs 232 and/or 234. DM-RSs 232 and 234 may be multiplexed using orthogonal codes, as reference signals for a plurality of layers. For example, in the case of 4-layer transmission, two different reference signals for each reference signal group may be multiplexed by applying 'an orthogonal code having a length of 2' to 'two consecutive reference signal resource elements in the time axis.' In the case of 8-layer transmission, four different reference signals for each reference signal group may be multiplexed by applying 'an orthogonal code having a length of 4' to 'four reference signal resource elements distributed in the time axis.'

In the case of 1-layer transmission or 2-layer transmission, since a reference signal of each layer may be transmitted using only one DM-RS group (e.g., DM-RS group 1 (232)), another DM-RS group (e.g., DM-RS group 2 (234)) may be used for a data transmission. DM-RS corresponding to each layer may be pre-coded according to a pre-coding scheme applied to the each layer, and be transmitted to user equipment. Accordingly, a receiving side (e.g., user equipment) may perform a data decoding without pre-coding information applied in a transmitting side (e.g., a base station).

In order to efficiently use limited resources in a wireless communication system, a control channel may be required. However, resources of control region 210 may correspond to system overhead, and therefore reduce resources of data region 220 available for data transmission. In an LTE system based on OFDM, one resource-block pair (RBP) may consist of 14 or 12 OFDM symbols. Among the OFDM symbols, a maximum of 3 OFDM symbols may be used for control region 210, and the remaining OFDM symbols may be used for data region 220. Meanwhile, in an LTE-A system capable of transmitting data to more users, system capacity enhancement may be restricted due to restricted resources of a typical control region (e.g., 210). Accordingly, in order to increase control channel resources, considering a method of transmitting/receiving multi-user control channels might be required, such as using a spatial division multiplexing scheme in data region 220. In other words, such method may transmit/receive control channels in data region 220. For example, a control channel transmitted in data region 220 may be referred to as 'extended PDCCH' or 'enhanced PDCCH' (EPDCCH), and is not limited thereto.

In a typical (or existing) 3GPP LTE/LTE-A rel-8/9/10 system, in order to receive a downlink DCI, all user equipment depend on the PDCCH which is transmitted through 'the first one, two, or three OFDM symbols' (in the case that system bandwidth >10 PRBs) or 'the first two, three, or four OFDM symbols' (in the case that system bandwidth ≤10 PRBs) in a downlink subframe. A basic unit of a PDCCH transmission for certain user equipment may be a control channel element (CCE). Herein, one CCE may consist of 9 resource element groups (REGs). One REG may consist of four consecutive resource elements (REs) in the frequency axis. Particularly, the four consecutive resource elements (REs) of the one REG may be selected, among the remaining resource elements (REs) excluding resource elements (REs) transmitting different physical channels (e.g., PCFICH, PHICH) and physical signals (e.g., CRS) in a PDCCH region of a corresponding downlink subframe.

Unlike the above-described legacy PDCCH, EPDCCH newly adopted (or defined) in a system associated with 3GPP LTE/LTE-A release 11 and its follow-up releases may be assigned in a PDSCH region of a downlink pilot time slot (DwPTS) in a downlink subframe or a special subframe. Furthermore, 3GPP LTE/LTE-A release 11 and its follow-up releases define that a corresponding cell may assign a K number of EPDCCH sets for the user equipment configured to receive downlink control information (DCI) through the EPDCCH. Herein, each EPDCCH set may consist of a group of 'M' PRBs. The 'M' is a natural number which is greater than or equal to "1" and is less than or equal to the number of PRBs associated with a downlink bandwidth. A maximum value of the 'K' may be selected as one of 2, 3, 4, and 6. Furthermore, each of the plurality of EPDCCH set determined for a given user equipment may have a different 'M' value.

EPDCCH sets may correspond to a localized type or a distributed type according to EPDCCH transmission types. The above-described 'M' may be 2, 4, or 8 for both of a localized type and a distributed type, and is not limited thereto.

Meanwhile, the K number of EPDCCH sets may be assigned for one user equipment. In this case, since each EPDCCH set is of either a distributed type or a localized type, a KL number of localized EPDCCH sets and a KD number of distributed EPDCCH sets may be assigned for one user equipment. That is, a sum of KL and KD may be "K" (KL+KD=K).

In order to perform an EPDCCH resource mapping for a given user equipment, an enhanced REG (EREG) or enhanced CCE (ECCE) corresponding to an REG or CCE of a typical PDCCH may be adopted or defined in the EPDCCH.

In the case of a newly-defined EREG/ECCE, a total of 16 EREGs (e.g., EREG #0 to EREG #15) may be included in one PRB pair of each EPDCCH set. Particularly, the one PRB pair may include a total of 16 EREGs, regardless of (i) a frame structure type, (ii) a subframe configuration, (iii) a length of a cyclic prefix (CP), (iv) a size of a legacy PDCCH control region, and/or (v) whether there are other reference signals (e.g., CRS, CSI-RS, PRS, etc.) excluding DM-RS.

More specifically, in the case of a normal cyclic prefix (CP), one PRB pair in a certain EPDCCH set may include a total of 168 resource elements (REs) (e.g., 12×14=168 REs). In this case, an EREG indexing may be performed for the remaining resource elements (REs) (e.g., 144 REs) excluding '24 resource elements (REs) for DM-RS' from the 168 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15. Similarly, in the case of an extended cyclic prefix (CP), one PRB pair in a certain EPDCCH set may include a total of 144 resource elements (REs) (e.g., 12×12=144 REs). In this case, an EREG indexing may be performed for the remaining resource elements (REs) (e.g., 128 REs) excluding '16 resource elements (REs) for DM-RS' from the 144 resource elements (REs). In other words, the EREG indexing may be performed using 16 numbers (e.g., 0, 1, 2, . . . , 15) according to a frequency-first scheme (i.e., a frequency first and then time manner). Accordingly, corresponding resource elements (REs) may be numbered (i.e., indexed) from 0 to 15.

In a downlink subframe with a normal cyclic prefix (CP) ("a normal DL subframe"), embodiments associated with an EREG indexing procedure for one PRB pair in a certain EPDCCH set will be described with reference to FIG. 3 to FIG. 8. In FIG. 3 to FIG. 8, deviant crease line portions without numerals may represent resource elements (REs) used for DS-RS, and deviant crease line portions or lattice-pattern portions with numerals may represent resource elements (REs) used for a CRS transmission.

Figure 3:
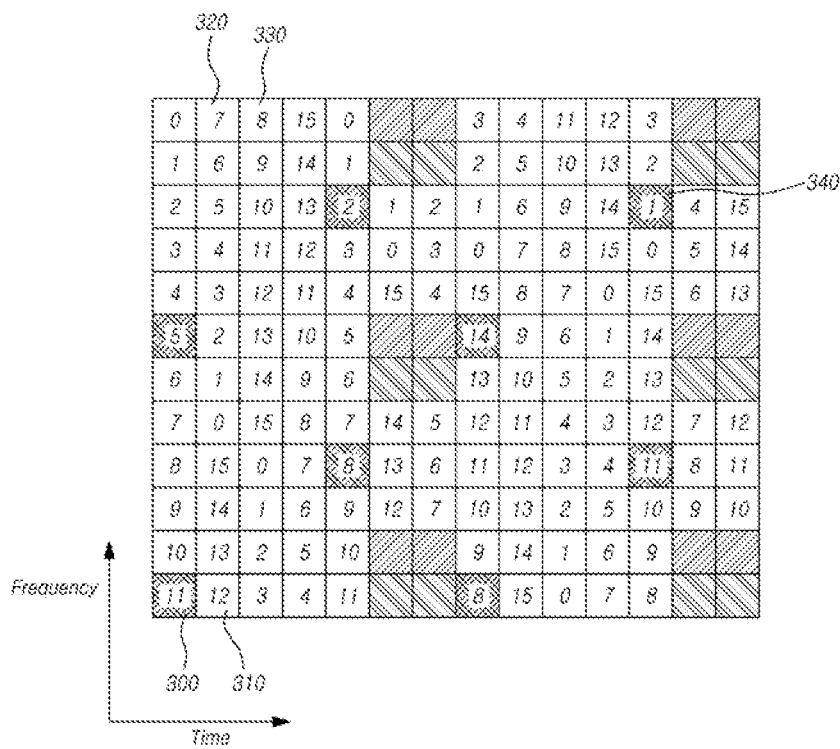
FIG. 3 illustrates a resource element (RE) mapping of a physical resource block (PRB) pair indexed according to an EREG indexing procedure with a symbol-based cyclic shift, in the case of one transmission antenna port (CRS port 0)

FIG. 3 illustrates a resource element (RE) mapping of a physical resource block (PRB) pair indexed according to an EREG indexing procedure with a symbol-based cyclic shift, in the case of one transmission antenna port (e.g., CRS port 0).

Referring to FIG. 3, EREGs may be numbered (i.e., indexed) from 0 to 15 according to a frequency-first scheme (i.e., a frequency first and then time manner). In embodiments shown in FIG. 3, indexing may be performed using a symbol-based cyclic shift. More specifically, as shown in FIG. 3, after a resource element (RE) indicated by "300" in the first symbol is indexed as 11 (i.e., index 11), a neighboring RE indicated by "310" in the second symbol is continuously indexed as 12 (i.e., index 12). In a same manner, after a resource element (RE) indicated by "320" in the second symbol is indexed as 7 (i.e., index 7), a neighboring RE indicated by "330" in a third symbol is continuously indexed as 8 (i.e., index 8).

A physical resource block (PRB) pair shown in FIG. 3 may be associated with CRS port 0. As shown in FIG. 3, CRSs may be mapped to 8 resource elements (REs). In other embodiments, the CRSs may be mapped to REs being at other positions according to frequency shifts.

Figure 4:
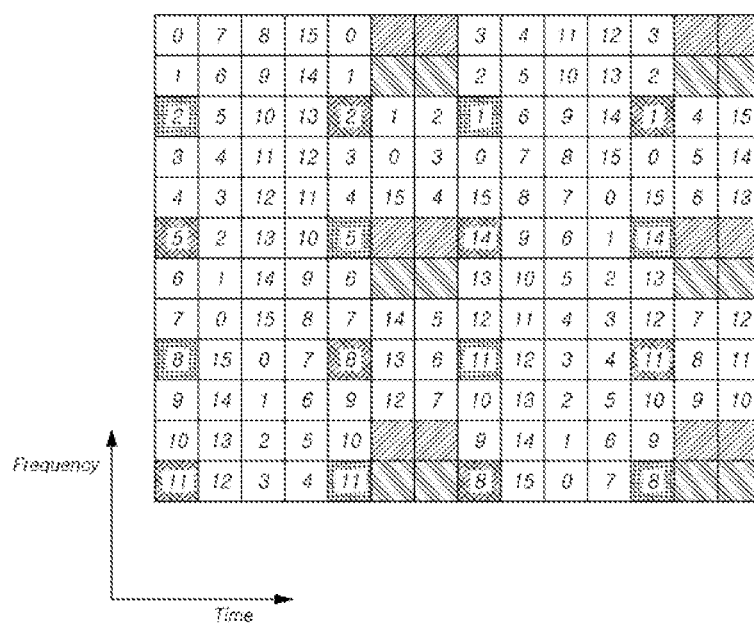
FIG. 4 illustrates an RE mapping of a PRB pair indexed according to an EREG indexing procedure with a symbol-based cyclic shift, in the case of two transmission antenna ports (CRS ports 0 and 1)
Figures 5, 6:
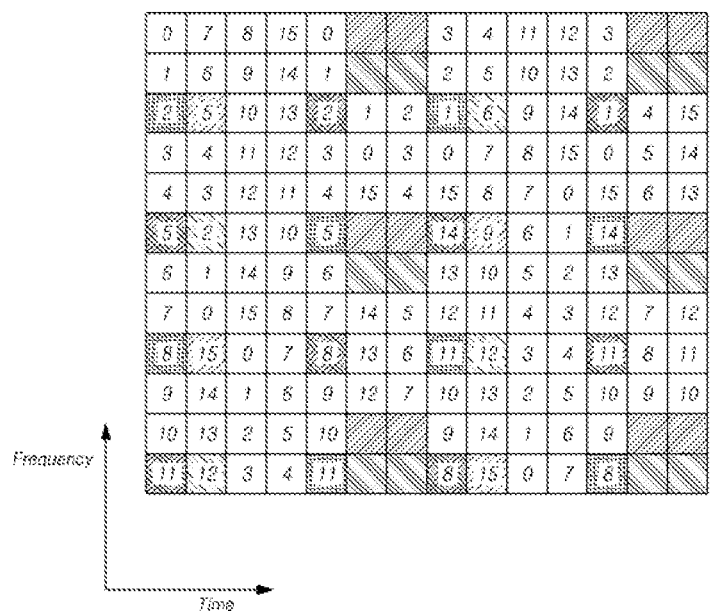
FIG. 5 illustrates an RE mapping of a PRB pair indexed according to an EREG indexing procedure with a symbol-based cyclic shift, in the case of four transmission antenna ports (CRS ports 0, 1, 2, and 3)
FIG. 6 illustrates an RE mapping of a PRB pair indexed according to an EREG indexing procedure without a cyclic shift, in the case of one transmission antenna port (CRS port 0)

FIG. 4 illustrates a resource element (RE) mapping of a physical resource block (PRB) pair indexed according to an EREG indexing procedure with a symbol-based cyclic shift, in the case of two transmission antenna ports (e.g., CRS ports 0 and 1). FIG. 5 illustrates an RE mapping of a PRB pair indexed according to an EREG indexing procedure with a symbol-based cyclic shift, in the case of four transmission antenna ports (e.g., CRS ports 0, 1, 2, and 3).

Resource elements (REs) shown in FIG. 4 and FIG. 5 may be indexed using a symbol-based cyclic shift, in the same manner as in FIG. 3. In FIG. 4, CRSs may be mapped to '8 additional REs' as well as 'the REs for CRS shown in FIG. 3' for CRS ports 0 and 1. In FIG. 5, CRSs may be mapped to '8 additional REs' as well as 'the REs for CRS shown in FIG. 4' for CRS ports 0, 1, 2, and 3.

Figure 7:
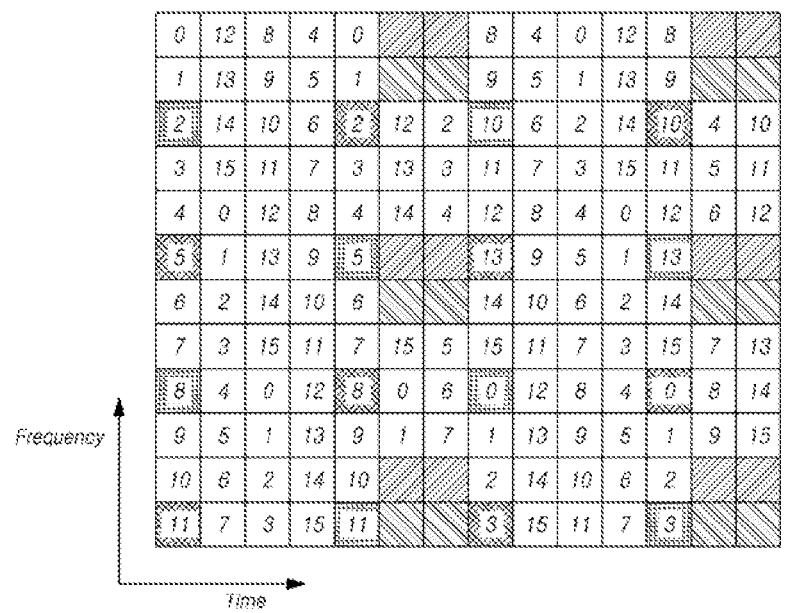
FIG. 7 illustrates an RE mapping of a PRB pair indexed according to an EREG indexing procedure without a cyclic shift, in the case of two transmission antenna ports (CRS ports 0 and 1)
Figure 8:
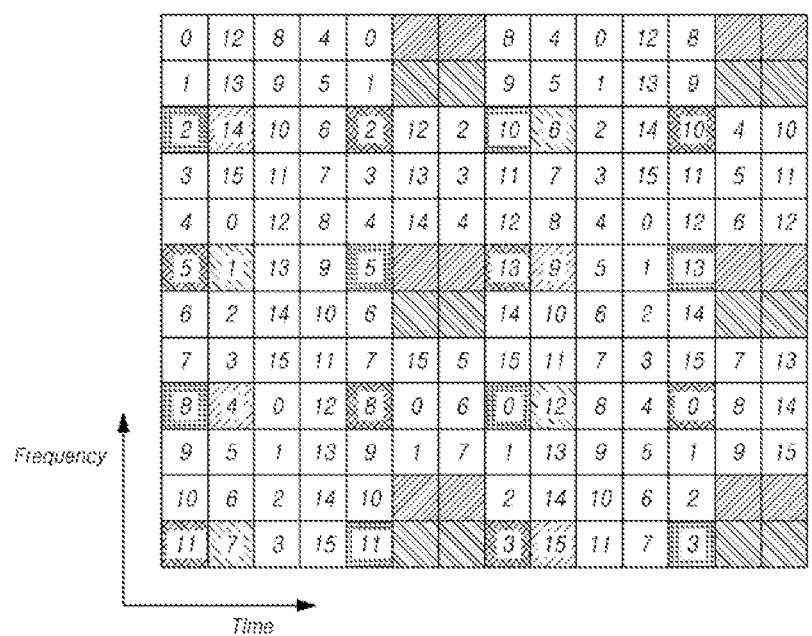
FIG. 8 illustrates an RE mapping of a physical resource block (PRB) pair indexed according to an EREG indexing procedure without a cyclic shift, in the case of four transmission antenna ports (CRS ports 0, 1, 2, and 3)

In the case that an EREG indexing is performed per OFDM symbol, FIG. 3 to FIG. 5 illustrate embodiments to which a cyclic shift is applied, and FIG. 6 to FIG. 8 illustrate embodiments to which a cyclic shift is not applied.

FIG. 6 illustrates an RE mapping of a PRB pair indexed according to an EREG indexing procedure without a cyclic shift, in the case of one transmission antenna port (e.g., CRS port 0). FIG. 7 illustrates an RE mapping of a PRB pair indexed according to an EREG indexing procedure without a cyclic shift, in the case of two transmission antenna ports (e.g., CRS ports 0 and 1). FIG. 8 illustrates an RE mapping of a physical resource block (PRB) pair indexed according to an EREG indexing procedure without a cyclic shift, in the case of four transmission antenna ports (e.g., CRS ports 0, 1, 2, and 3).

In FIG. 6 to FIG. 8, a mapping of CRSs may be performed in the same manner as in FIG. 3 to FIG. 5. However, indexing schemes may differ.

Representatively, referring to FIG. 6, EREGs may be numbered (i.e., indexed) from 0 to 15 according to a frequency-first scheme (i.e., a frequency first and then time manner). In embodiments shown in FIG. 6, indexing may be performed without a symbol-based cyclic shift. More specifically, as shown in FIG. 6, after a resource element (RE) indicated by "600" in the first symbol is indexed as 11 (i.e., index 11), an RE indicated by "610" in the second symbol is continuously indexed as 12 (i.e., index 12). Herein, the RE ("610") indexed as 12 (i.e., the RE ("610") corresponding to a next turn) is not adjacent to the RE ("600") indexed as 11. In the same manner, after an RE indicated by "620" in the second symbol is indexed as 7 (i.e., index 7), an RE indicated by "630" in a third symbol is continuously indexed as 8 (i.e., index 8). Herein, the RE ("630") indexed as 8 (i.e., the RE ("630") corresponding to a next turn) is not adjacent to the RE ("620") indexed as 7.

In FIG. 3 to FIG. 8, REs having the same index may be grouped into one EREG. Accordingly, in the case of one PRB pair, a total of 16 EREGs (e.g., EREG #0 to EREG #15) may be assigned. FIG. 3 to FIG. 8 illustrate embodiments associated with a PRB pair with a normal CP. That is, one PRB pair with the normal CP may consist of a total of 16 EREGs. Similarly, in the case of one PRB pair with an extended CP, a total of 16 EREGs (e.g., EREG #0 to EREG #15) may be assigned. That is, one PRB pair with the extended CP may include a total of 16 EREGs.

According to FIG. 3 to FIG. 8, each of the EREG (e.g., EREG #0, EREG #1, ..., EREG #15) configured in one PRB pair may consist of 9 REs. However, as shown in FIG. 3 to FIG. 8, the number of REs available for an EPDCCH transmission per EREG may differ according to the number of transmission antenna ports (or, a CRS port number) and a size of a legacy PDCCH region.

Referring back to FIG. 3, a total number of REs corresponding to index #0 is 9. However, in the case that a region associated with the first three OFDM symbols (l=0~2) are determined as a control region, REs included in the control region may not transmit EPDCCH, and therefore be excluded in the REs available for an EPDCCH transmission. Accordingly, EREG #0 may consist of a total of 6 available REs. In the case of an EREG corresponding to index #1, a total of REs indexed as #1 is 9. In this case, (i) REs within the control region (e.g., a region associated with the first three OFDM symbols) and (ii) REs (e.g., RE indicated by "340" in FIG. 3) to which CRSs are mapped may be excluded. Accordingly, EREG #1 may consist of a total of 5 available REs.

Each ECCE corresponding to a basic unit of an EPDCCH transmission may consist of an 'N' number of EREGs according to a subframe type and a CP length. More specifically, the N value may be determined as below.

In at least one embodiment, in the case of (i) normal subframes with a normal CP and (ii) special subframes 3, 4, and 8 with a normal CP, the N value may be determined as '4' (N=4). In other words, in this case, if 16 EREGs are included in one PRB pair, a total of 4 ECCEs may be configured since each ECCE consists of 4 EREGs.

In other embodiments, in the case of (i) normal subframes with an extended CP, (ii) special subframes 1, 2, 6, 7, and 9 with a normal CP, and (iii) special subframes 1, 2, 3, 5, and 6 with an extended CP, the N value may be determined as '8' (N=8). In other words, in this case, if 16 EREGs are included in one PRB pair, a total of 2 ECCEs may be configured since each ECCE consists of 8 EREGs.

In the case of a certain downlink subframe (e.g., a normal DL subframe), a typical PDCCH may be transmitted through 'the first one, two, or three OFDM symbols' (in the case that system bandwidth>10 PRBs) or 'the first two, three, or four OFDM symbols.' Furthermore, one CCE may consist of 9 REGs. Accordingly, the CCEs in PDCCH may consist of 36 (=9×4) REs.

However, as described with reference to FIG. 3 to FIG. 8, in the case of EPDCCH, EREG indexing may be performed per RE, without considering a size of a legacy control region (i.e., a size of a legacy PDCCH region) and REs used for other reference signals such as CRS and CSI-RS. Accordingly, the number of REs available for an EPDCCH transmission may differ according to a size of the legacy control region and the presence of the other reference signals (e.g., CRS, CSI-RS, etc.) in a certain downlink sub frame.

In other words, the number of REs available for an EPDCCH transmission may differ per EREG. Accordingly, in the case of an ECCE corresponding to a basic unit of an EPDCCH transmission, there may be an RE imbalance that the number of available REs differs per ECCE.

To overcome such problem, the present embodiment may provide a mapping method of EREGs constituting each ECCE. Particularly, the present embodiment may provide a method of performing an ECCE/EREG mapping (or may be referred to "an ECCE-to-EREG mapping") in a localized EPDCCH set (i.e., an EPDCCH set of a localized type).

More specifically, the present embodiment may provide a method of configuring each ECCE in a PRB pair constituting a localized EPDCCH set as described above. Especially, the present embodiment may consider a legacy PDCCH and CRSs transmitted through downlink pilot time slots (DwPTSs) in all downlink subframes and special subframes. Accordingly, the present embodiment may provide a relatively optimal ECCE/EREG mapping method considering the number of available REs for an EPDCCH transmission in a corresponding PRB pair.

Embodiment 1

ECCE Configuration Using an N Number of Consecutive EREGs

Embodiment 1 may provide a method of configuring one ECCE using an N number of consecutive EREGs, and a method of performing an ECCE indexing according to an ECCE configuration. Herein, the N number of consecutive EREGs are included in one PRB pair within an EPDCCH set.

In the case that a size of a legacy PDCCH region is '1' OFDM symbol, the number of available resource elements (REs) per EREG according to each CRS port configuration may be arranged as shown in Table 1 below.

TABLE 1

|  | CRS port 0 | CRS port 0, 1 | CRS port 0, 1, 2, 3 |
| --- | --- | --- | --- |
| EREG # 0 | 7 | 6 | 6 |
| EREG # 1 | 8 | 8 | 7 |
| EREG # 2 | 7 | 7 | 7 |
| EREG # 3 | 7 | 6 | 6 |
| EREG # 4 | 8 | 8 | 8 |
| EREG # 5 | 8 | 7 | 7 |
| EREG # 6 | 8 | 8 | 7 |
| EREG # 7 | 8 | 8 | 7 |
| EREG # 8 | 7 | 7 | 7 |
| EREG # 9 | 8 | 8 | 8 |
| EREG # 10 | 7 | 6 | 6 |
| EREG # 11 | 8 | 7 | 7 |
| EREG # 12 | 9 | 9 | 8 |
| EREG # 13 | 8 | 7 | 7 |
| EREG # 14 | 9 | 9 | 9 |
| EREG # 15 | 9 | 9 | 9 |

In Table 1 above, the number of available resource elements (REs) per EREG is arranged based on an EREG indexing to which a cyclic shift is not applied. In a corresponding subframe, one ECCE may consist of 4 EREGs (in the case that N=4). Accordingly, in the case that one ECCE consists of four consecutive EREGs according to Embodiment 1, EREGs constituting each EREG, and the number of available REs per ECCE may be arranged as shown in Table 2 below.

TABLE 2

| ECCE | EREG | 1 Tx CRS | 2 Tx CRS | 4 Tx CRS |
| --- | --- | --- | --- | --- |
| 1$^{st}$ ECCE | EREG #0~EREG #3 | 29 REs | 27 REs | 26 REs |
| 2$^{nd}$ ECCE | EREG #4~EREG #7 | 32 REs | 31 REs | 29 REs |
| 3$^{rd}$ ECCE | EREG #8~EREG #11 | 30 REs | 28 REs | 28 REs |
| 4$^{th}$ ECCE | EREG #12~EREG #15 | 35 REs | 34 REs | 33 REs |

In the case of four transmission antenna ports ("4 Tx CRS"), 1$^{st}$ ECCE may include 26 available REs, and 4$^{th}$ ECCE may include 33 available REs. Accordingly, an RE difference between 1$^{st}$ ECCE and 4$^{th}$ ECCE may be '7'. Like this, there may be an RE imbalance that the number of available REs differs per ECCE.

Even in the case that a size of a legacy PDCCH region is '2'(Table 3) or '3' (Table 5) OFDM symbols, there may be a similar characteristic as follows.

TABLE 3

|  | CRS port 0 | CRS port 0, 1 | CRS port 0, 1, 2, 3 |
| --- | --- | --- | --- |
| EREG # 0 | 6 | 5 | 5 |
| EREG # 1 | 7 | 7 | 6 |
| EREG # 2 | 6 | 6 | 6 |
| EREG # 3 | 6 | 5 | 5 |
| EREG # 4 | 7 | 7 | 7 |
| EREG # 5 | 7 | 6 | 6 |
| EREG # 6 | 7 | 7 | 6 |
| EREG # 7 | 7 | 7 | 6 |
| EREG # 8 | 7 | 7 | 7 |
| EREG # 9 | 8 | 8 | 8 |
| EREG # 10 | 7 | 6 | 6 |
| EREG # 11 | 8 | 7 | 7 |
| EREG # 12 | 8 | 8 | 7 |
| EREG # 13 | 7 | 6 | 6 |
| EREG # 14 | 8 | 8 | 8 |
| EREG # 15 | 8 | 8 | 8 |

Table 3 above may represent the number of available REs per EREG according to each CRS port configuration, in the case that a size of a legacy PDCCH region is '2' OFDM symbols. In the same situation as in Table 3, in the case that one ECCE consists of four consecutive EREGs, EREGs constituting each EREG, and the number of available REs per ECCE may be arranged as shown in Table 4 below.

TABLE 4

| ECCE | EREG | 1 Tx CRS | 2 Tx CRS | 4 Tx CRS |
| --- | --- | --- | --- | --- |
| 1$^{st}$ ECCE | EREG #0~EREG #3 | 25 REs | 23 REs | 22 REs |
| 2$^{nd}$ ECCE | EREG #4~EREG #7 | 28 REs | 27 REs | 25 REs |
| 3$^{rd}$ ECCE | EREG #8~EREG #11 | 30 REs | 28 REs | 28 REs |
| 4$^{th}$ ECCE | EREG #12~EREG #15 | 31 REs | 30 REs | 29 REs |

In the case of four transmission antenna ports ("4 Tx CRS"), 1$^{st}$ ECCE may include 22 available REs, and 4$^{th}$ ECCE may include 29 available REs. Accordingly, an RE difference between 1$^{st}$ ECCE and 4$^{th}$ ECCE may be '7'.

TABLE 5

|  | CRS port 0 | CRS port 0, 1 | CRS port 0, 1, 2, 3 |
| --- | --- | --- | --- |
| EREG # 0 | 5 | 4 | 4 |
| EREG # 1 | 6 | 6 | 5 |
| EREG # 2 | 5 | 5 | 5 |
| EREG # 3 | 5 | 4 | 4 |
| EREG # 4 | 7 | 7 | 7 |
| EREG # 5 | 7 | 6 | 6 |
| EREG # 6 | 7 | 7 | 6 |
| EREG # 7 | 7 | 7 | 6 |
| EREG # 8 | 6 | 6 | 6 |
| EREG # 9 | 7 | 7 | 7 |
| EREG # 10 | 6 | 5 | 5 |
| EREG # 11 | 7 | 6 | 6 |
| EREG # 12 | 7 | 7 | 6 |
| EREG # 13 | 6 | 5 | 5 |
| EREG # 14 | 7 | 7 | 7 |
| EREG # 15 | 7 | 7 | 7 |

Table 5 above may represent the number of available REs per EREG according to each CRS port configuration, in the case that a size of a legacy PDCCH region is '3' OFDM symbols. In the same situation as in Table 5, in the case that one ECCE consists of four consecutive EREGs, EREGs constituting each EREG, and the number of available REs per ECCE may be arranged as shown in Table 6 below.

TABLE 6

| ECCE | EREG | 1 Tx CRS | 2 Tx CRS | 4 Tx CRS |
|---|---|---|---|---|
| 1st ECCE | EREG #0~EREG #3 | 21 REs | 19 REs | 18 REs |
| 2nd ECCE | EREG #4~EREG #7 | 28 REs | 27 REs | 25 REs |
| 3rd ECCE | EREG #8~EREG #11 | 26 REs | 24 REs | 24 REs |
| 4th ECCE | EREG #12~EREG #15 | 27 REs | 26 REs | 25 REs |

In the case of four transmission antenna ports ("4 Tx CRS"), 1st ECCE may include 18 available REs, and 4th ECCE may include 25 available REs. Accordingly, an RE difference between 1st ECCE and 4th ECCE may be '7'.

In the case that a certain EPDCCH set including a group of 'M' PRBs (M may be 2, 4, 8, or 16) is of a localized type, ECCEs constituting a corresponding EPDCCH set may be configured according to Embodiment 1 as described below.

More specifically, in the case of an M number of PRBs constituting a localized EPDCCH set, ECCEs may be configured and indexed according to Embodiment 1, in ascending order starting from a lowest PRB pair (i.e., a PRB pair having the lowest PRB index).

Figure 9:
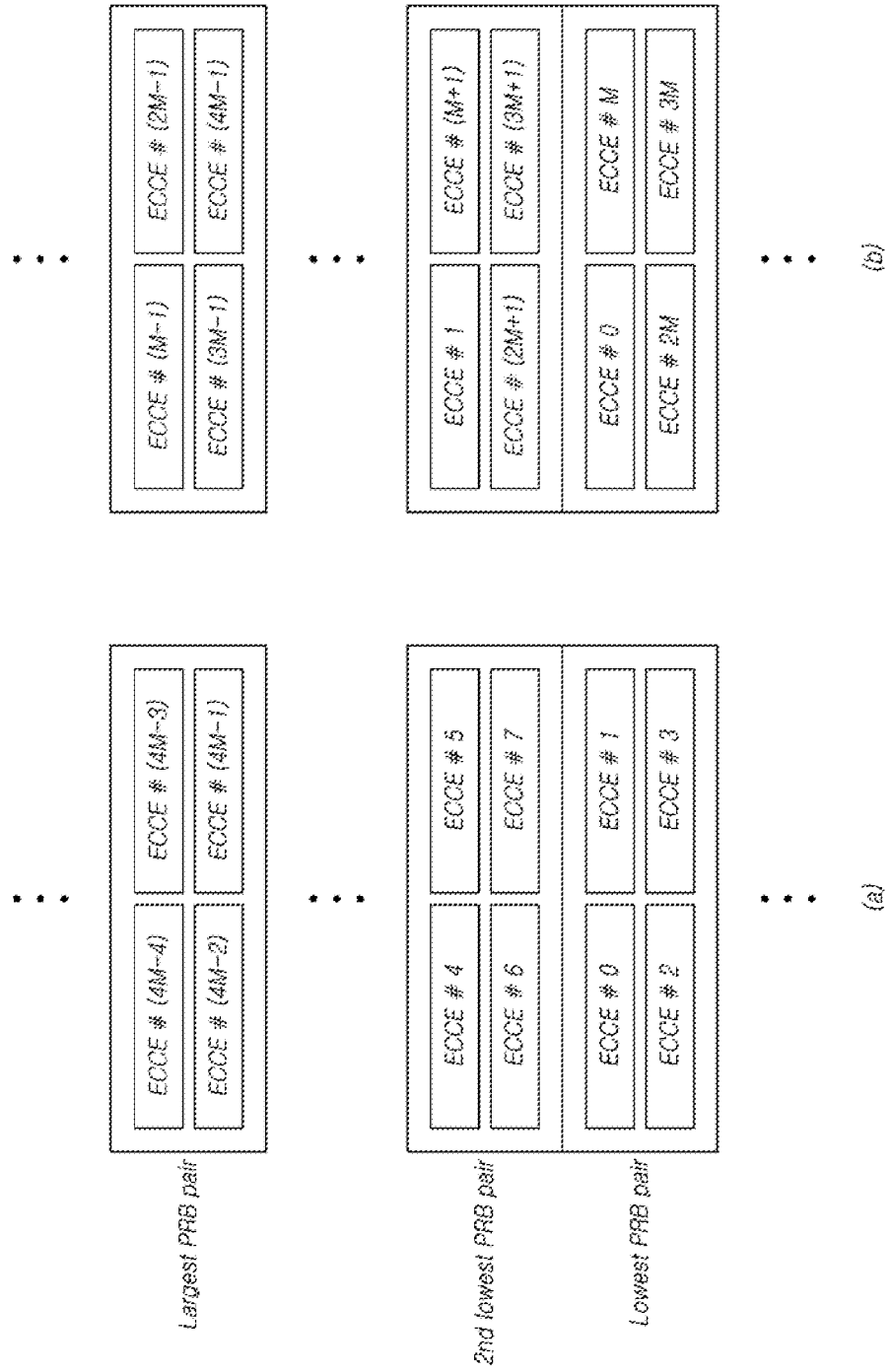
FIG. 9 illustrates an ECCE/EREG mapping in a localized EPDCCH set according to Embodiment 1 and Embodiment 2.

Referring to FIG. 9(a), an ECCE indexing and an EREG mapping for an ECCE configuration in a corresponding localized EPDCCH set may be performed as below. First, in the lowest PRB pair, 1st ECCE consisting of EREG #0 to EREG #3 may be indexed as ECCE #0. 2nd ECCE consisting of EREG #4 to EREG #7 may be indexed as ECCE #1. 3rd ECCE consisting of EREG #8 to EREG #11 may be indexed as ECCE #2. 4th ECCE consisting of EREG #12 to EREG #15 may be indexed as ECCE #3. Thereafter, in the case of a PRB pair having a second lowest PRB index, an ECCE configuration and an ECCE indexing may be performed in the same manner. More specifically, in the second lowest PRB pair, 1st ECCE, 2nd ECCE, 3rd ECCE, and 4th ECCE may consist of EREG #0 to EREG #3, EREG #4 to EREG #7, EREG #8 to EREG #11, and EREG #12 to EREG #15, respectively. The 1st ECCE, 2nd ECCE, 3rd ECCE, and 4th ECCE may be indexed as ECCE #4, ECCE #5, ECCE #6, and ECCE #7, respectively. Similarly, each of four ECCEs configured in a PRB pair having an Mth lowest PRB index may be indexed as ECCE #(4M−4), ECCE #(4M−3), ECCE #(4M−2), and ECCE #(4M−1).

Alternatively, in the case that an EPDCCH set consists of an M number of PRBs, an ECCE indexing may be sequentially performed from 1st ECCEs in each PRB pair. Herein, each of the 1st ECCEs may consist of EREG #0, EREG #1, EREG #2, and EREG #3 in each PRB pair.

First, referring to FIG. 9(b), an 'M' number of 1st ECCEs may be sequentially numbered (i.e., indexed) from ECCE #0 to ECCE #(M−1), in an increasing order of a corresponding PRB index (i.e., an index of a corresponding PRB including each ECCE). In other words, an ECCE indexing for the M number of 1st ECCEs may be performed from the lowest PRB pair to Mth lowest PRB pair (i.e., the largest PRB pair). Herein, the 'M' number of 1st ECCEs may include from '1st ECCE of the lowest PRB pair' to '1st ECCE of Mth lowest PRB pair (i.e., the largest PRB pair).' Each of the 1st ECCEs may consist of EREG #0, EREG #1, EREG #2, and EREG #3. Second, an 'M' number of 2nd ECCEs may be sequentially numbered (i.e., indexed) from ECCE #M to ECCE #(2M−1), in an increasing order of a corresponding PRB index. In other words, an ECCE indexing for the M number of 2nd ECCEs may be performed from the lowest PRB pair to the largest PRB pair (i.e., Mth lowest PRB pair). Herein, 2nd ECCE in each PRB pair may consist of EREG #4, EREG #5, EREG #6, and EREG #7. Third, similarly, 3rd ECCEs may be sequentially numbered (i.e., indexed) from ECCE #2M to ECCE #(3M−1), in an increasing order of a corresponding PRB index. Herein, 3rd ECCE in each PRB pair may consist of EREG #8 to EREG #11. Fourth, similarly, 4th ECCEs may be sequentially numbered (i.e., indexed) from ECCE #3M to ECCE #(4M−1), in an increasing order of a corresponding PRB index. Herein, 4th ECCE in each PRB pair may consist of EREG #12 to EREG #15.

Embodiment 2

ECCE Configuration Using EREGs Having an Identical Remainder When EREG Indices are Divided by 4 (or 2)

As known above, in the case that one ECCE is configured by merely binding four consecutive EREGs, there may be an imbalance of the number of available REs per ECCE. The primary reason of the imbalance may be that an availability of 12 consecutive REs corresponding to one OFDM symbol is determined according to a size of a legacy PDCCH region. In other words, among 16 EREGs, a difference between 'EREGs associated with 12 consecutive REs' and 'EREGs associated with 4 consecutive REs not corresponding to the 12 consecutive REs' may occur.

In order to overcome such imbalance, Embodiment 2 may provide a method of configuring one ECCE, by binding EREGs having an identical remainder (e.g., 0, 1, 2, or 3) in the case that corresponding EREG indices are divided by 4 (i.e., EREG index mod 4) in one PRB pair constituting an EPDCCH set. Herein, "mod" represents a 'modulo' operation.

Accordingly, each ECCE may be configured as below.
1st ECCE: EREG #n corresponding to (n mod 4)=0
2nd ECCE: EREG #n corresponding to (n mod 4)=1
3rd ECCE: EREG #n corresponding to (n mod 4)=2
4th ECCE: EREG #n corresponding to (n mod 4)=3
Herein, n=0, 1, 2, . . . , 15. The 'n' may represent an EREG index shown in FIG. 3 to FIG. 8.

More specifically, in a PRB pair associated with a certain EPDCCH set, (i) 1st ECCE may consist of EREG #0, EREG #4, EREG #8, and EREG #12, (ii) 2nd ECCE may consist of EREG #1, EREG #5, EREG #9, and EREG #13, (iii) 3rd ECCE may consist of EREG #2, EREG #6, EREG #10, and EREG #14, and (iv) 4th ECCE may consist of EREG #3, EREG #7, EREG #11, and EREG #15. In the case that ECCEs are configured as described above, available REs per ECCE may be calculated according to a size of a legacy PDCCH region as below.

In the case that a size of a legacy PDCCH region is '1' OFDM symbol, EREGs constituting each ECCE and the number of available REs per ECCE may be configured as shown in Table 7 below.

TABLE 7

| ECCE | EREG | 1 Tx CRS | 2 Tx CRS | 4 Tx CRS |
|---|---|---|---|---|
| 1st ECCE | EREG #0, EREG #4, EREG #8, EREG #12 | 31 REs | 30 REs | 28 REs |
| 2nd ECCE | EREG #1, EREG #5, EREG #9, EREG #13 | 32 REs | 30 REs | 28 REs |
| 3rd ECCE | EREG #2, EREG #6, EREG #10, EREG #14 | 31 REs | 30 REs | 28 REs |
| 4th ECCE | EREG #3, EREG #7, EREG #11, EREG #15 | 32 REs | 30 REs | 28 REs |

In the case that a size of a legacy PDCCH region is '2' OFDM symbols, EREGs constituting each ECCE and the number of available REs per ECCE may be configured as shown in Table 8 below.

TABLE 8

| ECCE | EREG | 1 Tx CRS | 2 Tx CRS | 4 Tx CRS |
| --- | --- | --- | --- | --- |
| $1^{st}$ ECCE | EREG #0, EREG #4, EREG #8, EREG #12 | 28 REs | 27 REs | 26 REs |
| $2^{nd}$ ECCE | EREG #1, EREG #5, EREG #9, EREG #13 | 29 REs | 27 REs | 26 REs |
| $3^{rd}$ ECCE | EREG #2, EREG #6, EREG #10, EREG #14 | 28 REs | 27 REs | 26 REs |
| $4^{th}$ ECCE | EREG #3, EREG #7, EREG #11, EREG #15 | 29 REs | 27 REs | 26 REs |

In the case that a size of a legacy PDCCH region is '3' OFDM symbols, EREGs constituting each ECCE and the number of available REs per ECCE may be configured as shown in Table 9 below.

TABLE 9

| ECCE | EREG | 1 Tx CRS | 2 Tx CRS | 4 Tx CRS |
| --- | --- | --- | --- | --- |
| $1^{st}$ ECCE | EREG #0, EREG #4, EREG #8, EREG #12 | 25 REs | 24 REs | 23 REs |
| $2^{nd}$ ECCE | EREG #1, EREG #5, EREG #9, EREG #13 | 26 REs | 24 REs | 23 REs |
| $3^{rd}$ ECCE | EREG #2, EREG #6, EREG #10, EREG #14 | 25 REs | 24 REs | 23 REs |
| $4^{th}$ ECCE | EREG #3, EREG #7, EREG #11, EREG #15 | 26 REs | 24 REs | 23 REs |

As describe above, when a "modulo 4" operation is applied to each EREG index value in one PRB pair included in an EPDCCH set, one ECCE may be configured by binding four EREGs having an identical modulo value. Herein, the identical modulo value associated with a "modulo 4" operation may correspond to an identical remainder when each EREG index value is divided by 4. Such ECCE configuration method may overcome an imbalance of the number of available REs per ECCE.

Such ECCE configuration method may be applied in the same manner, even in the case that an EREG indexing per OFDM symbol is performed using a cyclic shift.

Accordingly, in the case that a certain EPDCCH set consisting of a group of M PRBs (i.e., a PRB group including an M number of PRBs) is of a localized type, ECCEs may be configured in a corresponding EPDCCH set, according to Embodiment 2 as described herein.

Even in the case that ECCEs are configured according to Embodiment 2, an ECCE indexing associated with an M number of PRBs forming a localized EPDCCH set may be performed according to two ECCE indexing schemes based on Embodiment 1.

More specifically, the ECCE indexing may be performed from '$1^{st}$ ECCE of the lowest PRB pair' to '$4^{th}$ ECCE of $M^{th}$ lowest PRB pair (i.e., the largest PRB pair).' Herein, the lowest PRB pair may represent a PRB pair having the lowest PRB index. The $1^{st}$ ECCE may be an ECCE consisting of EREG #0, EREG #4, EREG #8, and EREG #12 in a corresponding PRB pair, according to Embodiment 2 above. The $M^{th}$ lowest PRB pair may represent a PRB pair having the $M^{th}$ lowest PRB index (i.e., the largest PRB index). The $4^{th}$ ECCE may be an ECCE consisting of EREG #3, EREG #7, EREG #11, and EREG #15 in a corresponding PRB pair.

Referring to FIG. 9(a), in the case that each localized EPDCCH set consists of an M number of PRBs, $1^{st}$ ECCE, $2^{nd}$ ECCE, $3^{rd}$ ECCE, and $4^{th}$ ECCE in the lowest PRB pair may be indexed as ECCE #0, ECCE #1, ECCE #2, and ECCE #3, respectively. Herein, the $1^{st}$ ECCE may consist of EREG #0, EREG #4, EREG #8, and EREG #12. The $2^{nd}$ ECCE may consist of EREG #1, EREG #5, EREG #9, and EREG #13. The $3^{rd}$ ECCE may consist of EREG #2, EREG #6, EREG #10, and EREG #14. The $4^{th}$ ECCE may consist of EREG #3, EREG #7, EREG #11, and EREG #15. Thereafter, in the $2^{nd}$ lowest PRB pair, $1^{st}$ ECCE, $2^{nd}$ ECCE, $3^{rd}$ ECCE, and $4^{th}$ ECCE may be indexed as ECCE #4, ECCE #5, ECCE #6, and ECCE #7, respectively, in the same manner as in the lowest PRB pair. According to an above-described ECCE indexing, $4^{th}$ ECCE (i.e., an ECCE consisting of EREG #3, EREG #7, EREG #11, and EREG #15) in the $M^{th}$ lowest PRB pair (i.e., the largest PRB pair) may be indexed as ECCE #(4M-1).

In other embodiments, referring back to FIG. 9(b), $1^{st}$ ECCEs (e.g., an ECCE consisting of EREG #0, EREG #4, EREG #8, and EREG #12) configured per PRB pair may be sequentially numbered (i.e., indexed) from ECCE #0 to ECCE #(M-1). Similarly, $2^{nd}$ ECCEs configured per PRB pair may be sequentially numbered (i.e., indexed) from ECCE #M to ECCE #(2M-1). $3^{rd}$ ECCEs configured per PRB pair may be sequentially numbered (i.e., indexed) from ECCE #2M to ECCE #(3M-1). $4^{th}$ ECCEs configured per PRB pair may be sequentially numbered (i.e., indexed) from ECCE #3M to ECCE #(4M-1).

Hitherto, in the case that the number of EREGs constituting one ECCE is 4 (N=4), an ECCE/EREG mapping and an ECCE indexing in a corresponding localized EPDCCH set were described. Herein, (i) normal downlink subframes with a normal CP, and (ii) special subframes 3, 4, and 8 with a normal CP may correspond to the case of N=4.

Likewise, even in the case that the number of EREGs constituting one ECCE is 8 (N=8), the ECCE/EREG mapping and the ECCE indexing described above may be applied. Herein, (i) normal downlink subframes with an extended CP, (ii) special subframes 1, 2, 6, 7, and 9 with a normal CP, and (iii) special subframes 1, 2, 3, 5, and 6 with an extended CP may correspond to the case of N=4.

As described with respect to Embodiment 1, in the case that each PRB pair constituting a localized EPDCCH includes 16 EREGs, each ECCE may be configured by binding four consecutive EREGs, and therefore 4 ECCEs may be configured per PRB pair. In other embodiments, each ECCE may be configured by binding eight consecutive EREGs in place of four consecutive EREGs. Accordingly, in such other embodiments, $1^{st}$ ECCE (including EREG #0 to EREG #7) and $2^{nd}$ ECCE (including EREG #8 to EREG #15) may be configured in each PRB pair. Meanwhile, as described with respect to Embodiment 2, in the case that each PRB pair constituting a localized EPDCCH includes 16 EREGs, each ECCE may be configured by binding four EREGs according to operation results of 'modulo 4.' More specifically, when a "modulo 4" operation is applied to each EREG index value, each ECCE may be configured by binding four EREGs having an identical modulo value. Herein, the identical modulo value associated with a "modulo 4" operation may correspond to an identical remainder when each EREG index value is divided by 4. In other embodiments, a 'modulo 2' operation may be applied in place of the 'modulo 4' operation. Accordingly, in such other embodiments, each ECCE may consist of 8 EREGs having an identical modulo value associated with a "modulo 2" operation. In other words, $1^{st}$ ECCE (including EREG #0, EREG #2, EREG #4, EREG #6, EREG #8, EREG #10, EREG #12, and EREG #14) and $2^{nd}$ ECCE (including EREG #1, EREG #3, EREG #5, EREG #7, EREG #9, EREG #11, EREG #13, and EREG #15) may be configured in each PRB pair. As described above, in the case that the number of EREGs constituting one ECCE is 8 (N=8), an ECCE/EREG mapping may be performed in the same manner as in the case of N=4. Furthermore, in the case of N=8, an ECCE indexing in a corresponding EPDCCH set may be performed in the same manner as in the case of N=4. More specifically, the ECCE indexing may be performed from '$1^{st}$ ECCE in the lowest PRB pair' to '$2^{nd}$ ECCE in the largest PRB pair.' That is, '$1^{st}$ ECCE in the lowest PRB pair' to '$2^{nd}$ ECCE in the largest PRB pair' may be indexed as ECCE #0, ECCE #1, ..., ECCE #(2M−1), respectively. Herein, the lowest PRB pair may represent a PRB pair having the lowest PRB index. The largest PRB pair may represent a PRB pair having the largest PRB index.

Figure 10:
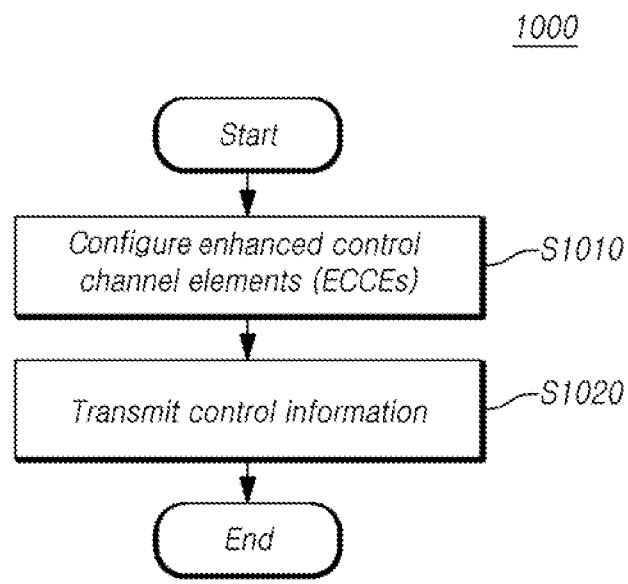
FIG. 10 is a flowchart illustrating a method of transmitting control information in a transmission/reception point in accordance with at least one embodiment.

FIG. 10 is a flowchart illustrating a method (1000) of transmitting control information in a transmission/reception point in accordance with at least one embodiment.

Referring to FIG. 10, the transmission/reception point may transmit control information to user equipment through a data region of a resource-block pair (e.g., PRB pair) in a subframe. At step S1010, the transmission/reception point may configure (or form) enhanced control channel elements (ECCEs) (or may referred to as "assign ECCEs") for a transmission of the control information. Herein, resource elements (REs) in the PRB pair may be indexed by repetitively using 16 numbers (e.g., 0, 1, 2, ..., 15) according to a frequency-first scheme (i.e., a frequency first and then time manner). Resource elements (REs) having an identical index may be included in an identical enhanced resource-element group (EREG). Each ECCE may include EREGs corresponding to EREG indices having an identical modulo value. More specifically, each of the ECCEs configured at step S1010 may be configured with (i) EREGs corresponding to EREG indices having an identical remainder (e.g., 0, 1, 2, or 3) when the EREG indices are divided by 4, or (ii) EREGs corresponding to EREG indices having the identical remainder (e.g., 0 or 1) when the EREG indices are divided by 2.

Examples of indices assigned to a PRB pair were described with reference to FIG. 3 to FIG. 8. Referring to FIG. 3 and FIG. 6, EREGs may be numbered (i.e., indexed) from 0 to 15 according to a frequency-first scheme (i.e., a frequency first and then time manner). In embodiments shown in FIG. 3, indexing may be performed using a symbol-based cyclic shift. More specifically, as shown in FIG. 3, after a resource element (RE) indicated by "300" in the first symbol is indexed as 11 (i.e., index 11), a neighboring RE indicated by "310" in the second symbol is continuously indexed as 12 (i.e., index 12). Meanwhile, in embodiments shown in FIG. 6, indexing may be performed without a symbol-based cyclic shift. Accordingly, in this case, as shown in FIG. 6, after a resource element (RE) indicated by "600" in the first symbol is indexed as 11 (i.e., index 11), an RE indicated by "610" in the second symbol is continuously indexed as 12 (i.e., index 12).

The transmission/reception point may configure at least one ECCE using (i) EREGs corresponding to EREG indices having an identical remainder (e.g., 0, 1, 2, or 3) when the EREG indices are divided by 4, or (ii) EREGs corresponding to EREG indices having an identical remainder (e.g., 0 or 1) when the EREG indices are divided by 2.

For example, ECCEs may be configured with EREGs corresponding to EREG indices having an identical remainder (e.g., 0, 1, 2, or 3) when the EREG indices are divided by 4. More specifically, one ECCE may consist of EREG #0, EREG #4, EREG #8, and EREG #12. Another ECCE may consist of EREG #1, EREG #5, EREG #9, and EREG #13.

Another ECCE may consist of EREG #2, EREG #6, EREG #10, and EREG #14. The other ECCE may consist of EREG #3, EREG #7, EREG #11, and EREG #15. Furthermore, an EREG index group corresponding to each ECCE may be expressed as {0, 4, 8, 12}, {1, 5, 9, 13}, {2, 6, 10, 14}, or {3, 7, 11, 15}.

In other embodiments, in the case that ECCEs are configured with EREGs corresponding to EREG indices having an identical remainder (e.g., 0 or 1) when the EREG indices are divided by 2, one ECCE may consist of EREG #0, EREG #2, EREG #4, EREG #6, EREG #8, EREG #10, EREG #12, and EREG #14. The other ECCE may consist of EREG #1, EREG #3, EREG #5, EREG #7, EREG #9, EREG #11, and EREG #13. Furthermore, an EREG index group corresponding to each ECCE may be expressed as {0, 2, 4, 6, 8, 10, 12, 14} or {1, 3, 5, 7, 9, 11, 13, 15}.

At step S1020, the transmission/reception point may transmit the control information to the user equipment, through at least one of the configured ECCEs.

Herein, the control information may be transmitted through EPDCCH corresponding to a control channel defined in a data region 220. The EPDCCH may be assigned to at least one ECCE in a resource-block pair (e.g., a PRB pair).

The resource-block pair (e.g., a PRB pair) carrying the control information may be one PRB in an EPDCCH set. Herein, the EPDCCH set may consist of a group of 'M' PRBs (i.e., a PRB group consisting of an M number of PRBs). The EPDCCH set may be of a localized type or a distributed type according to EPDCCH transmission types. The M number may be 2, 4, or 8 for both of the localized type and the distributed type, and is not limited thereto.

The resource-block pair (e.g., a PRB pair) carrying the control information may constitute one downlink EPDCCH set according to a localized type scheme, along with one or more other resource-block pairs (e.g., one or more other PRB pairs). That is, the resource-block pair carrying the control information and the one or more other resource-block pairs may constitute the one downlink EPDCCH set according to the localized type scheme.

Figure 11:
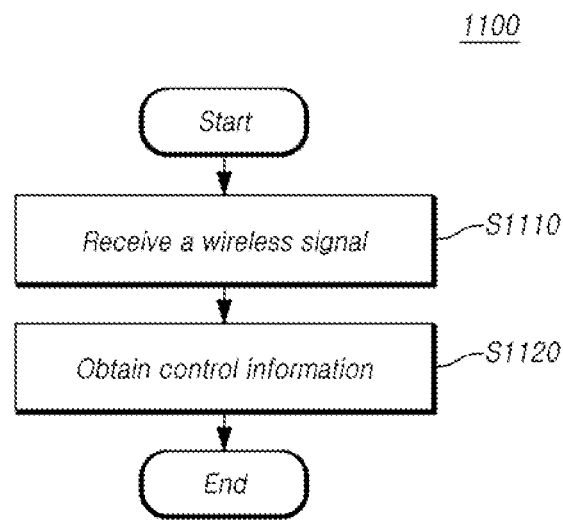
FIG. 11 is a flowchart illustrating a method of receiving control information in user equipment in accordance with other embodiments.

FIG. 11 is a flowchart illustrating a method (1100) of receiving control information in user equipment in accordance with other embodiments.

Referring to FIG. 11, the user equipment may receive control information from a transmission/reception point through a data region of a resource-block pair (e.g., a PRB pair) in a subframe. More specifically, at step S1110, the user equipment may receive a wireless signal (may be referred to as "a radio signal") through at least one ECCE. Herein, resource elements (REs) in the PRB pair may be indexed by repetitively using 16 numbers (e.g., 0, 1, 2, ..., 15) according to a frequency-first scheme (i.e., a frequency first and then time manner). Resource elements (REs) having an identical index may be included in an identical enhanced resource-element group (EREG). Each of the at least one ECCE may include EREGs corresponding to EREG indices having an identical modulo value. More specifically, each of the at least one ECCE may be configured with (i) EREGs corresponding to EREG indices having an identical remainder (e.g., 0, 1, 2, or 3) when the EREG indices are divided by 4, or (ii) EREGs corresponding to EREG indices having an identical remainder (e.g., 0 or 1) when the EREG indices are divided by 2. Furthermore, at step S1120, the user equipment may obtain the control information from the received wireless signal.

Examples of indices assigned to a PRB pair were described with reference to FIG. 3 to FIG. 8. Referring to FIG. 3 and FIG. 6, EREGs may be numbered (i.e., indexed) from 0 to 15 according to a frequency-first scheme (i.e., a frequency first and then time manner). In embodiments shown in FIG. 3, indexing may be performed using a symbol-based cyclic shift. More specifically, as shown in FIG. 3, after a resource element (RE) indicated by "300" in the first symbol is indexed as 11 (i.e., index 11), a neighboring RE indicated by "310" in the second symbol is continuously indexed as 12 (i.e., index 12). Meanwhile, in embodiments shown in FIG. 6, indexing may be performed without a symbol-based cyclic shift. Accordingly, in this case, as shown in FIG. 6, after a resource element (RE) indicated by "600" in the first symbol is indexed as 11 (i.e., index 11), an RE indicated by "610" in the second symbol is continuously indexed as 12 (i.e., index 12). Herein, the RE ("610") indexed as 12 is not adjacent to the RE ("600") indexed as 11.

The transmission/reception point may constitute an ECCE using (i) EREGs corresponding to EREG indices having an identical remainder (e.g., 0, 1, 2, or 3) when the EREG indices are divided by 4, or (ii) EREGs corresponding to EREG indices having an identical remainder (e.g., 0 or 1) when the EREG indices are divided by 2.

For example, ECCEs may be configured with EREGs corresponding to EREG indices having an identical remainder when the EREG indices are divided by 4. More specifically, one ECCE may consist of EREG #0, EREG #4, EREG #8, and EREG #12. Another ECCE may consist of EREG #1, EREG #5, EREG #9, and EREG #13. Another ECCE may consist of EREG #2, EREG #6, EREG #10, and EREG #14. The other ECCE may consist of EREG #3, EREG #7, EREG #11, and EREG #15. Furthermore, an EREG index group corresponding to each ECCE may be expressed as {0, 4, 8, 12}, {1, 5, 9, 13}, {2, 6, 10, 14}, or {3, 7, 11, 15}.

In other embodiments, ECCEs may be configured with EREGs corresponding to EREG indices having an identical remainder when the EREG indices are divided by 2. More specifically, one ECCE may consist of EREG #0, EREG #2, EREG #4, EREG #6, EREG #8, EREG #10, EREG #12, and EREG #14. The other ECCE may consist of EREG #1, EREG #3, EREG #5, EREG #7, EREG #9, EREG #11, and EREG #13. Furthermore, an EREG index group corresponding to each ECCE may be expressed as {0, 2, 4, 6, 8, 10, 12, 14} or {1, 3, 5, 7, 9, 11, 13, 15}.

Figure 12:
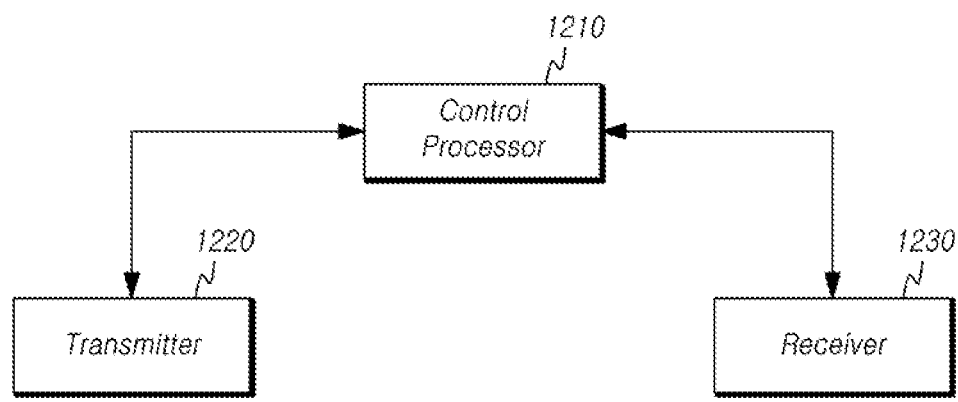
FIG. 12 is a diagram illustrating a transmission/reception point in accordance with some embodiments.

FIG. 12 is a diagram illustrating a transmission/reception point in accordance with some embodiments.

Referring to FIG. 12, transmission/reception point 1200 according to the present embodiment may transmit control information to user equipment through a data region in a resource-block pair (e.g., a PRB pair) in a subframe. Transmission/reception point 1200 according to the present embodiment may include control processor 1210, transmitter 1220, and receiver 1230.

Control processor 1210 may configure (or form) ECCEs for a transmission of the control information. More specifically, resource elements (REs) in the PRB pair may be indexed by repetitively using 16 numbers (e.g., 0, 1, 2, ..., 15) according to a frequency-first scheme (i.e., a frequency first and then time manner). Resource elements (REs) having an identical index may be included in an identical enhanced resource-element group (EREG). Each ECCE may include EREGs corresponding to EREG indices having an identical modulo value. In more detail, each of the ECCEs may be configured with (i) EREGs corresponding to EREG indices having an identical remainder (e.g., 0, 1, 2, or 3) when the EREG indices are divided by 4, or (ii) EREGs corresponding to EREG indices having the identical remainder (e.g., 0 or 1) when the EREG indices are divided by 2.

Herein, the resource-block pair (e.g., a PRB pair) may constitute one downlink EPDCCH set according to a localized type scheme, along with one or more other resource-block pairs (e.g., one or more other PRB pairs). That is, the resource-block pair and the one or more other resource-block pairs may constitute the one downlink EPDCCH set according to the localized type scheme. Furthermore, EREG indices (i.e., an EREG index group) corresponding to each of the configured ECCEs may be one of {0, 4, 8, 12}, {1, 5, 9, 13}, {2, 6, 10, 14}, and {3, 7, 11, 15}. Alternatively, an EREG index group corresponding to each of the configured ECCEs may be one of {0, 2, 4, 6, 8, 10, 12, 14} and {1, 3, 5, 7, 9, 11, 13, 15}.

In addition, control processor 1210 may control operations of transmission/reception point 1200, according to a method of performing an ECCE/EREG mapping for an EPDCCH transmission and/or a method of performing an ECCE indexing in a certain localized EPDCCH set.

Transmitter 1220 may transmit the control information to the user equipment, through at least one of the configured ECCEs.

Transmitter 1220 and receiver 1230 may respectively transmit and receive signals, messages, and/or data required for performing the above-described present embodiments, in connection with the user equipment.

Figure 13:
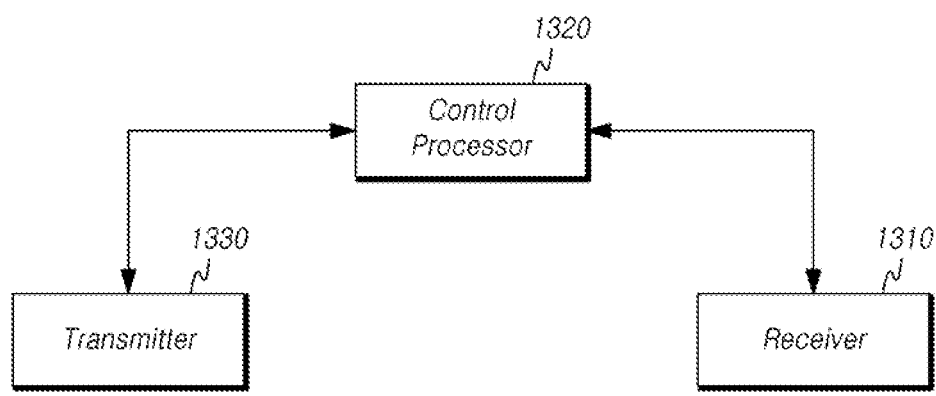
FIG. 13 is a diagram illustrating user equipment in accordance with some embodiments.

FIG. 13 is a diagram illustrating user equipment in accordance with some embodiments.

Referring to FIG. 13, user equipment 1300 according to the present embodiment may receive control information from a transmission/reception point (e.g., transmission/reception point 1200) through a data region of a physical resource-block pair (a PRB pair) in a subframe. User equipment 1300 according to the present embodiment may include receiver 1310, control processor 1320, and transmitter 1330.

Receiver 1310 may receive a wireless signal through at least one ECCE. Herein, resource elements (REs) in the PRB pair are indexed by repetitively using 16 numbers (e.g., 0, 1, 2, ..., 15) according to a frequency-first scheme (i.e., a frequency first and then time manner). Resource elements (REs) having an identical index are included in an identical enhanced resource-element group (EREG). Each of the at least one ECCE may include EREGs corresponding to EREG indices having an identical modulo value. In this case, each of the at least one ECCE may be configured with (i) EREGs corresponding to EREG indices having an identical remainder (e.g., 0, 1, 2, or 3) when the EREG indices are divided by 4, or (ii) EREGs corresponding to EREG indices having an identical remainder (e.g., 0 or 1) when the EREG indices are divided by 2.

Herein, the resource-block pair (e.g., a PRB pair) may constitute one downlink EPDCCH set according to a localized type scheme, along with one or more other resource-block pairs (e.g., one or more other PRB pairs). That is, the resource-block pair and the one or more other resource-block pairs may constitute the one downlink EPDCCH set according to the localized type scheme. Furthermore, EREG indices (i.e., an EREG index group) corresponding to each of the at least one ECCE may be one of {0, 4, 8, 12}, {1, 5, 9, 13}, {2, 6, 10, 14}, and {3, 7, 11, 15}. Alternatively, an EREG index group corresponding to each of the at least one ECCE may be one of {0, 2, 4, 6, 8, 10, 12, 14} and {1, 3, 5, 7, 9, 11, 13, 15}.

Control processor 1320 may obtain the control information from the received wireless signal. Furthermore, control processor 1820 may control operations (i.e., operations of user equipment 1800) which are required for performing the above-described present embodiments. More specifically, control processor 1320 may control operations of user equipment 1300, according to an ECCE/EREG mapping for an EPDCCH reception and/or an ECCE indexing in a certain localized EPDCCH set.

Receiver 1310 and transmitter 1330 may respectively receive and transmit signals, messages, and/or data required for performing the above-described present embodiments, in connection with the transmission/reception point.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting control information to user equipment through a data region of a physical resource-block (PRB) pair in a subframe, in a transmission/reception point, the method comprising:
    forming enhanced control channel elements (ECCEs), wherein (i) resource elements (REs) in the PRB pair are indexed by repetitively using 16 numbers according to a frequency-first scheme, (ii) resource elements (REs) having an identical index are included in an identical enhanced resource-element group (EREG), and (iii) each of the ECCEs includes EREGs corresponding to EREG indices having an identical remainder when the EREG indices are divided by N, where the N is one of 4 and 2; and
    transmitting the control information to the user equipment through at least one of the ECCEs.

2. The method of claim 1, wherein the PRB pair along with at least one other PRB pair is used to configure one enhanced physical downlink control channel (EPDCCH) set according to a localized type scheme.

3. The method of claim 2, wherein the ECCEs are indexed from a first ECCE of a lowest PRB pair of the EPDCCH set to an N-th ECCE of a largest PRB pair of the EPDCCH set.

4. The method of claim 1, wherein an EREG index group corresponding to the each of the ECCEs is selected as one of $\{n|(n \bmod 4)=0\}$, $\{n|(n \bmod 4)=1\}$, $\{n|(n \bmod 4)=2\}$, and $\{n|(n \bmod 4)=3\}$, where the n is an EREG index.

5. The method of claim 1, wherein an EREG index group corresponding to the each of the ECCEs is selected as one of $\{n|(n \bmod 2)=0\}$ and $\{n|(n \bmod 2)=1\}$, where the n is an EREG index.

6. A method of receiving control information from a transmission/reception point through a data region of a physical resource-block (PRB) pair in a subframe, in user equipment, the method comprising:
    receiving a wireless signal through at least one enhanced control channel element (ECCE), wherein (i) resource elements (REs) in the PRB pair are indexed by repetitively using 16 numbers according to a frequency-first scheme, (ii) resource elements (REs) having an identical index are included in an identical enhanced resource-element group (EREG), and (iii) each of ECCEs includes EREGs corresponding to EREG indices having an identical remainder when the EREG indices are divided by N, where the N is one of 4 and 2; and
    obtaining the control information from the received wireless signal.

7. The method of claim 6, wherein the PRB pair along with at least one other PRB pair is used to configure one enhanced physical downlink control channel (EPDCCH) set according to a localized type scheme.

8. The method of claim 7, wherein the ECCEs are indexed from a first ECCE of a lowest PRB pair of the EPDCCH set to an N-th ECCE of a largest PRB pair of the EPDCCH set.

9. The method of claim 6, wherein an EREG index group corresponding to the each of the ECCEs is selected as one of $\{n|(n \bmod 4)=0\}$, $\{n|(n \bmod 4)=1\}$, $\{n|(n \bmod 4)=2\}$, and $\{n|(n \bmod 4)=3\}$, where the n is an EREG index.

10. The method of claim 6, wherein an EREG index group corresponding to the each of the ECCEs is selected as one of $\{n|(n \bmod 2)=0\}$ and $\{n|(n \bmod 2)=1\}$, where the n is an EREG index.

11. A transmission/reception point for transmitting control information to user equipment through a data region of a physical resource-block (PRB) pair in a subframe, the transmission/reception point comprising:
    a control processor configured to form enhanced control channel elements (ECCEs), wherein (i) resource elements (REs) in the PRB pair are indexed by repetitively using 16 numbers according to a frequency-first scheme, (ii) resource elements (REs) having an identical index are included in an identical enhanced resource-element group (EREG), and (iii) each of the ECCEs includes EREGs corresponding to EREG indices having an identical remainder when the EREG indices are divided by N, where the N is one of 4 and 2; and
    a transmitter configured to transmit the control information to the user equipment through at least one of the ECCEs.

12. The transmission/reception point of claim 11, wherein the PRB pair along with at least one other PRB pair is used to configure one enhanced physical downlink control channel (EPDCCH) set according to a localized type scheme.

13. The transmission/reception point of claim 12, wherein the ECCEs are indexed from a first ECCE of a lowest PRB pair of the EPDCCH set to an N-th ECCE of a largest PRB pair of the EPDCCH set.

14. The transmission/reception point of claim 11, wherein an EREG index group corresponding to the each of the ECCEs is selected as one of $\{n|(n \bmod 4)=0\}$, $\{n|(n \bmod 4)=1\}$, $\{n|(n \bmod 4)=2\}$, and $\{n|(n \bmod 4)=3\}$, where the n is an EREG index.

15. The transmission/reception point of claim 11, wherein an EREG index group corresponding to the each of the ECCEs is selected as one of $\{n|(n \bmod 2)=0\}$ and $\{n|(n \bmod 2)=1\}$, where the n is an EREG index.

16. A user equipment receiving control information from a transmission/reception point through a data region of a physical resource-block (PRB) pair in a subframe, the user equipment comprising:

a receiver configured to receive a wireless signal through at least one enhanced control channel element (ECCE), wherein (i) resource elements (REs) in the PRB pair are indexed by repetitively using 16 numbers according to a frequency-first scheme, (ii) resource elements (REs) having an identical index are included in an identical enhanced resource-element group (EREG), and (iii) each of ECCEs includes EREGs corresponding to EREG indices having an identical remainder when the EREG indices are divided by N, where the N is one of 4 and 2; and a control processor configured to obtain the control information from the received wireless signal.

17. The user equipment of claim 16, wherein the PRB pair along with at least one other PRB pair is used to configure one enhanced physical downlink control channel (EPDCCH) set according to a localized type scheme.

18. The user equipment of claim 17, wherein the ECCEs are indexed from a first ECCE of a lowest PRB pair of the EPDCCH set to an N-th ECCE of a largest PRB pair of the EPDCCH set.

19. The user equipment of claim 16, wherein an EREG index group corresponding to the each of the ECCEs is selected as one of $\{n|(n \bmod 4)=0\}$, $\{n|(n \bmod 4)=1\}$, $\{n|(n \bmod 4)=2\}$, and $\{n|(n \bmod 4)=3\}$, where the n is an EREG index.

20. The user equipment of claim 16, wherein an EREG index group corresponding to the each of the ECCEs is selected as one of $\{n|(n \bmod 2)=0\}$ and $\{n|(n \bmod 2)=1\}$, where the n is an EREG index.

\* \* \* \* \*